United States Patent [19]

Behn et al.

[11] Patent Number: 4,552,225
[45] Date of Patent: Nov. 12, 1985

[54] CULTIVATOR SHIELD ATTACHMENT

[76] Inventors: Ernest E. Behn; Jerome L. Behn, both of R.R. #1, Boone, Iowa 50036

[21] Appl. No.: 546,281

[22] Filed: Oct. 28, 1983

[51] Int. Cl.$^4$ .............................................. A01B 39/26
[52] U.S. Cl. .................................................... 172/513
[58] Field of Search ............... 192/512, 513, 511, 307, 192/466

[56] References Cited

U.S. PATENT DOCUMENTS

| | | | |
|---|---|---|---|
| 556,112 | 3/1896 | Teal | 172/512 |
| 2,417,597 | 3/1947 | Hill | 172/512 |
| 2,593,176 | 4/1952 | Patterson | 172/466 X |
| 2,597,111 | 5/1952 | Lathers | 172/511 |
| 4,026,366 | 5/1977 | Doughty | 172/512 |
| 4,282,936 | 8/1981 | Zuhone | 172/512 |

OTHER PUBLICATIONS

All Purpose Heavy Duty Cultivator—Advertizing Brochure of Buffalo, 9/1975, Fleischer Mfg. Co., Colombus, Nebraska.

Primary Examiner—Richard J. Johnson
Attorney, Agent, or Firm—James F. Simon

[57] ABSTRACT

A deep shield for cultivating is disclosed, comprised of an elongated horizontal bar, fastened at its forward end by adaptors to any make of cultivator, whose rearward end supports a vertical parallel linkage, extending downward to another horizontal bar supporting a pair of panels approximately 16 inches in depth, having a large outward flair on their forward end. Pivotal points on parallel linkage are positioned and formed for maximum stability, flexible enough to allow backward movement if an obstruction is encountered, backward and upward movement of flex arms allows for easy height adjustment by solidly attaching two irons to lower support so they extend vertically past the upper support bar. By using a pin member through aligned holes in vertical irons, height changes may be easily established.

4 Claims, 3 Drawing Figures

CULTIVATOR SHIELD ATTACHMENT

BACKGROUND OF INVENTION

In a Ridge-till System, after a farmer has planted his crop and young plants are still small, he may wish to cultivate to get rid of weeds. In so doing he will want to push a little soil into the row of growing plants to cover up small weeds. He must be carful or he will cover the crop as well as weeds and reduce his stand. Shields were invented so a small amount of soil could slip under the shield and cover weeds, but large amounts of soil are deflected by the shield and the small plants are protected. These shields are only seven or eight inches high and as crops get 12 inches, 18 inches, or 24 inches tall the shield must be removed or it will press down and damage the growing crop. Then when ridges are being built large clods and flying residue will damage the crop. Something is needed to protect the crop when it is small and *again when it is tall* and ridges are built. The "Deep Shield" was designed for this multiple purpose. All other cultivator shields are 7 inches to 9 inches in depth. The new Deep Shield is approximately 16 inches deep and 33 inches long and can be used for corn 36 inches tall. This is a much needed device.

SUMMARY OF INVENTION

This invention consists of a horizontal elongated support bar connected at its forward end, directly to, or by adaptor, to the upper frame of a cultivator and extending rearward. From this upper bar is a parallel linkage extending downward to a second elongated bar, held parallel to the upper support bar by a linkage positioned for maximum stability. To the bottom of the second elongated bar two or three vertically extending inverted "U" shaped irons are fastened with the "U" shape perpendicular to the bar. Metal or plastic panels with flared forward ends are fastened to the inverted vertically extending "U" shaped irons in such manner that they form a tunnel through which plants can pass when being cultivated. Two rigid laterally spaced irons with holes punched at close intervals are fastened vertically, to the second elongated bar and made to extend upward on either side of the top elongated support bar so that a pin may be placed through holes above the top bar. When lower bar is moved back and up, additional holes appear above the top bar. The pin can now be placed in the newly exposed holes to lock it in position. The panels on either side are much deeper than normal shields, hence the "deep shield" connotation.

An object of invention is to build a deep shield that would protect small emerging crops, and that same shield be deep enough to allow cultivating tall growing crops up to 36 inches tall without damage, a dual purpose shield.

A further object is to build a shield that would not need to be removed for either first or subsequent cultivations or ridging.

A further object of the invention is to permit farmers to build larger ridges without damage to crop.

A further object is to construct the parallel linkage with maximum stability.

A further object is to save time by permitting faster ridging speeds.

A further object is to provide the "easiest to adjust" shield anywhere.

A further object is to provide a shield that is always in the *best position possible*. (NOTE: When shield is down and forward, soil from the cultivator sweep contacts the shield near its center. When shields are in back and up position, soil from *ridging wings* which are behind the sweeps will also contact the shield near its center. The swing "back and up" feature is unique and makes this possible.)

DESCRIPTION OF VIEWS

FIG. 1, a perspective view of the "Deep Shield", showing attachment to the frame of a cultivator, the large flair at forward ends, the parallel linkage, and the handy height adjustment (19, 20, 21).

FIG. 2, front view of "Deep Shield" shows how tall crops can pass through shield without damage.

FIG. 3, side view showing how shield may swing back and up to adjust height and also to improve *position* of *shield* when ridging.

DESCRIPTION OF PREFERRED EMBODIMENT

Figure 1:
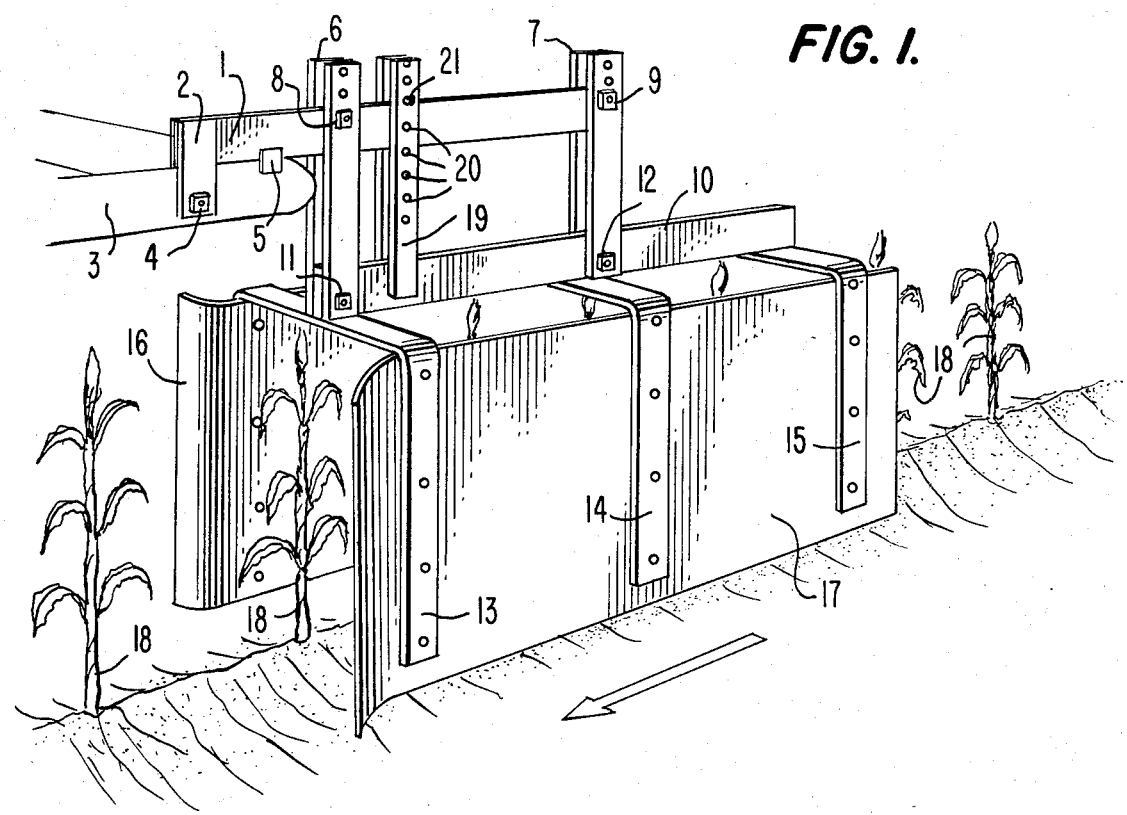
Figure 2:
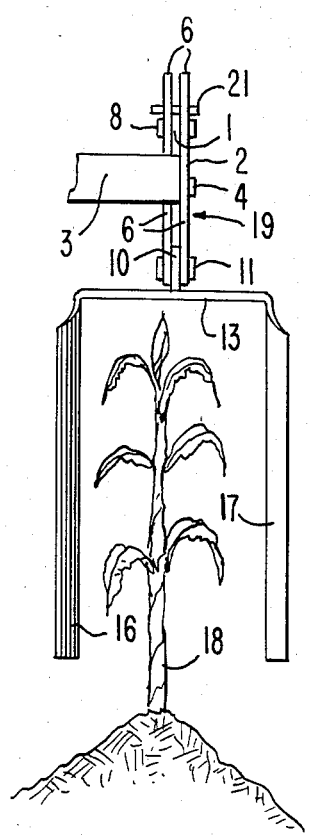
Figure 3:
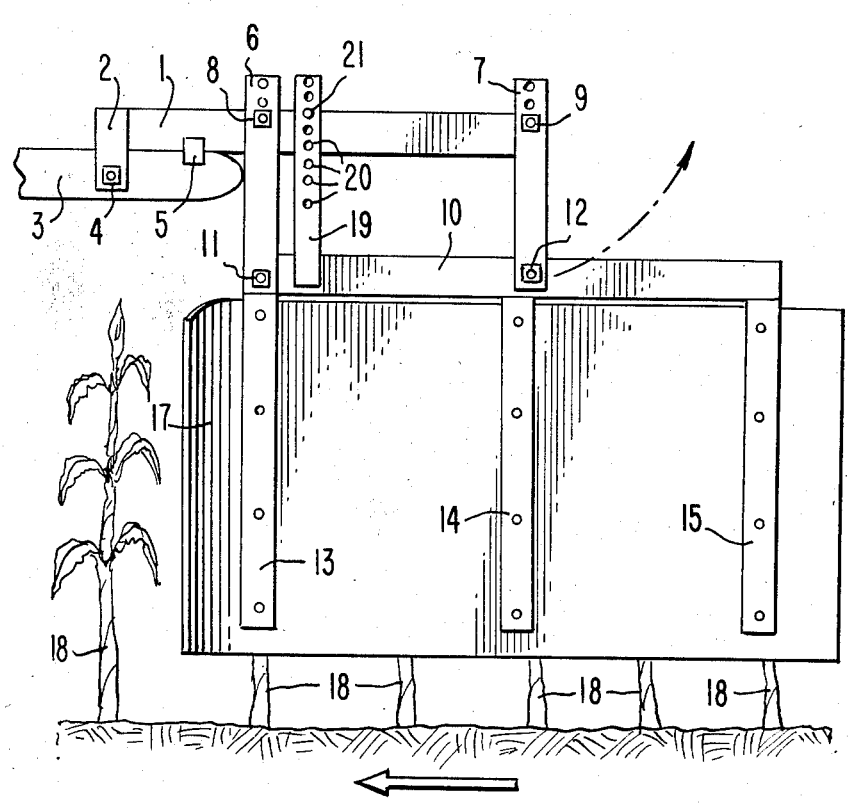

The "Deep Shield" is designed to fit on a Buffalo cultivator frame, but with attachments will fit numerous other makes of cultivators. This is how it is made:

An upper elongated steel bar 1 of suitable size and length was placed on edge on top of box frame 3 of a Buffalo cultivator in such manner that the forward end rested just over hole 4, (this is the normal attachment point for Buffalo shields carried below the frame). Two adaptor irons 2 were cut and welded to bar 1 so a bolt could be placed through hole 4 and tightened to hold bar in position, and horizontal. Two straps 5 were welded to both sides of bar 1 so they could prevent side to side movement of bar 1. Now holes 8 and 9 were drilled toward the top edge of upper elongated bar 1 to give maximum stability to strap irons 6 and 7 when a bolt is placed in holes 8 and 9. Strap irons 6 and 7 are held loosely by bolts 8 and 9 so strap irons 6 and 7 can move or turn on the axel provided by bolts 8 and 9. In the same manner holes 11 and 12 are placed toward the lower side of second elongated bar 10 to give maximum stability to the shield below when bolts 11 and 12 are fastened loosely in place. Bolts 11 and 12 serve as axel for the lower part of parallel linkage and must allow a second elongated bar 10 to move back and up so they are fastened snugly but not tight. Friction nuts are placed on bolts 8, 9, 11, and 12 to prevent them from coming off or loose. Inverted "U" shaped strap irons 13, 14, and 15 are now fastened to base of bar 10 and perpendicular to it, in such manner that they point downward. Now metal or plastic panels 16 and 17 are fastened to the vertically extending "U" frames 13, 14, and 15 in such manner as to form a tunnel through which crops can pass when being cultivated or ridged. Panels 16 and 17 have a large outward flair at forward end to gather bushy crops into shield and hold them up for ridging. Brackets at forward end of bar 1 are variable in shape and make the "Deep Shield" adaptable to all makes of cultivators. Two straps 19 are fastened securely and vertically to second elongated bar 10 and extend upward just above upper elongated bar 1. This double strap arrangement has aligned holes placed at close intervals. Pin 21 is placed through holes above bar 1. When bar 10 is moved back, it is forced up by parallel linkage formed by straps 6 and 7. As straps 19 are forced upward, additional holes will appear above bar 1. Pin 21 can then be placed in the proper hole to give quick and easy shield height adjustment.

We claim:

1. A support bracket for mounting a shield on a cultivator frame, said bracket comprising an upper elongated support bar having an adapter member rigidly secured at one end, said adapter member being constructed to be fixedly secured to a cultivator frame member with said upper bar extending substantially horizontal in a rearward direction, a second elongated bar rigidly mounted on the upper portion of a shield member, said second bar being positioned below and generally parallel with said upper bar, a pair of longitudinally spaced parallel links pivotally attached at their ends to said upper and second bar, each of said links comprising a pair of laterally spaced members with one of said members positioned on each side of said upper and second bar, a height adjusting mechanism comprising a pair of rigid laterally spaced vertical strap members rigidly secured to said second bar and straddling said bar, said strap members including a plurality of aligned openings along their length, pin means adapted to be selectively positioned through one of said aligned openings and abut the upper surface of said upper bar whereby to floatingly secure the shield at a selected height above the ground.

2. The invention defined in claim 1 wherein said shield comprises a pair of laterally spaced panels and each panel is approximately 16 inches in height.

3. A support bracket for mounting a shield on a cultivator frame, said bracket comprising an upper elongated bar having an adapter member rigidly secured at one end, said adapter member being constructed to be fixedly secured to a cultivator frame member with said upper bar extending substantially horizontal in a rearward direction, a second elongated bar rigidly mounted on the upper portion of a shield member, said second bar being positioned below and generally parallel with said upper bar, a pair of longitudinally spaced parallel links pivotally attached at their ends to said upper and second bar, each of said links comprising a pair of laterally spaced members with one of said members positioned on each side of said upper and second bar, height adjusting means connected between said upper and second bar to permit said shield to float above the ground while permitting the shields to raise upon meeting an obstruction, each said shield comprising a pair of laterally generally vertically extending panels, each panel having a forward edge flaired outwardly, said panels being approximately sixteen inches in depth and thirty three inches in length.

4. The invention defined in claim 3 wherein said support bracket includes a height adjusting mechanism, said height adjusting mechanism comprising a pair of rigid laterally spaced vertical strap members rigidly secured to said second bar and straddling said bars, said strap members including a plurlity of aligned openings along their length, pin means adapted to be selectively positioned through one of said aligned openings and abut the upper surface of said upper bar whereby to floatingly secure the shield at a selected height above the ground.

* * * * *